Nov. 10, 1959 J. E. CANDLIN, JR 2,912,234
SUSPENSION SYSTEM AIR SPRING
Filed March 16, 1956 4 Sheets-Sheet 1
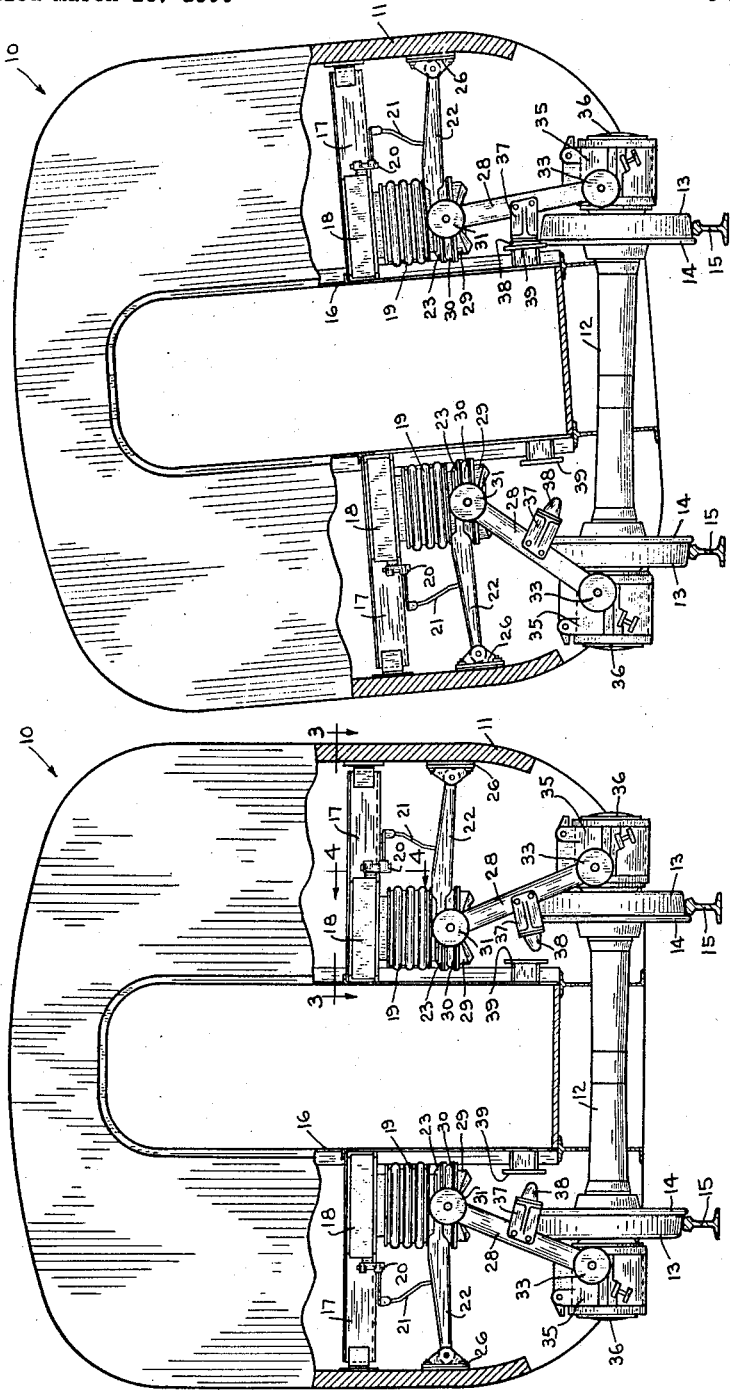
INVENTOR
JAMES E. CANDLIN, JR.
BY Cromwell, Greist & Warden
ATTORNEYS Nov. 10, 1959 J. E. CANDLIN, JR 2,912,234
SUSPENSION SYSTEM AIR SPRING
Filed March 16, 1956 4 Sheets-Sheet 3

INVENTOR
JAMES E. CANDLIN, JR.
BY Cromwell, Greist & Warden
ATTORNEYS

Nov. 10, 1959   J. E. CANDLIN, JR   2,912,234
SUSPENSION SYSTEM AIR SPRING
Filed March 16, 1956   4 Sheets-Sheet 4
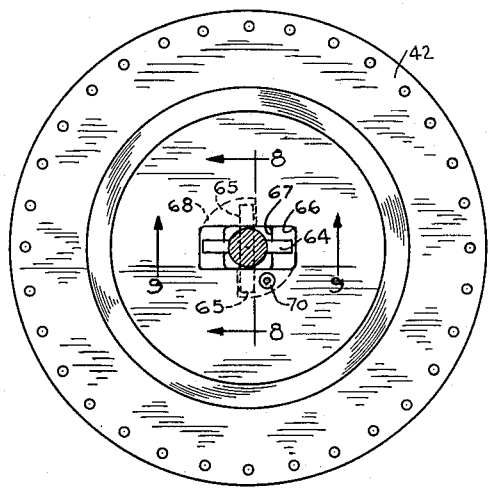
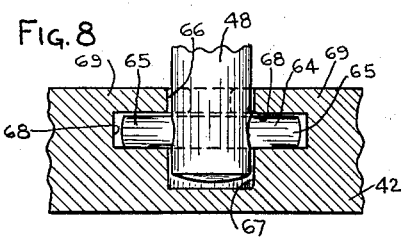
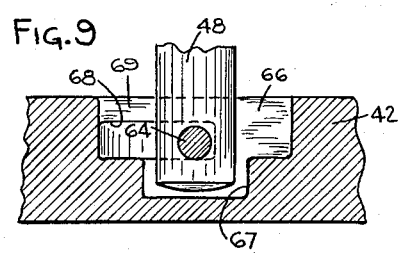
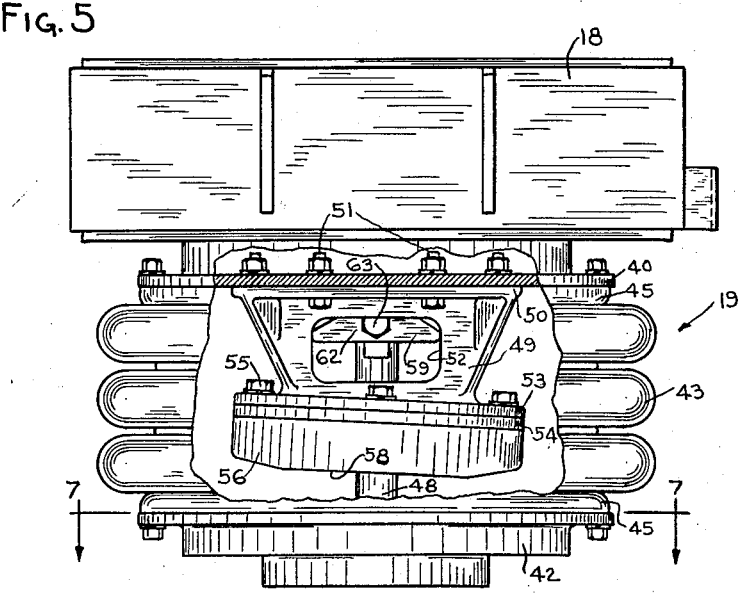
INVENTOR
JAMES E. CANDLIN, JR.
BY Cromwell, Greist & Warden
ATTORNEYS

United States Patent Office 2,912,234
Patented Nov. 10, 1959

2,912,234

SUSPENSION SYSTEM AIR SPRING

James E. Candlin, Jr., Lansing, Ill., assignor to Pullman Incorporated, a corporation of Delaware Application March 16, 1956, Serial No. 571,869

8 Claims. (Cl. 267—3)

The present invention relates generally to an improved form of fluid pressurized spring for use in supporting a vehicle body with respect to a wheel-carrying axle. More specifically, the present invention is directed to an improved form of air spring and suspension system utilizing the same, which air spring is adapted to be automatically regulated in response to variations in loads carried by a vehicle body by varying the internal air pressure carried thereby, and which spring is further provided with expansion and compression limiting means to protect the same against damage by excessive expansion or compression, which limiting means further incorporate elements capable of cooperatively functioning with parts of a special form of suspension system with which the improved air spring is particularly adapted for use.

In improving the riding comfort of vehicle carried passengers it has been found desirable to utilize air springs in the form of pressurized bellows in the make-up of the suspension system supporting a vehicle body with respect to a wheel-carrying axle. Springs of this nature are provided with internal pressure which is varied in response to the load carried by the vehicle body and the air cushioning effect afforded provides a soft and comfortable ride for the passengers carried by the vehicle. Regulation of the air pressure carried by the air springs is often automatically controlled by the use of leveling valves which function to either increase the air pressure carried by the springs or bleed the same to a certain extent in response to vertical relative movement of the vehicle body with respect to the axle. Due to unevenness in the roadbed being traveled, the vehicle body moves vertically with respect to the axle as a result of operational impacts. The air springs are compressed or expanded as a result of vertical impacts and in order to prevent damage to the springs, provision should be made to limit the dynamic travel of the springs from their normal position.

In the design and production of passenger carrying railway cars, emphasis has been placed on increasing the speed of operation and decreasing the total weight of the cars. Lightweight, high speed railway cars have been designed which utilize but a single axle positioned near one end of the car thereby resulting in a single axle car having a wheel-supported end, the remaining end being connected in load-bearing support with a wheel-supported end of an adjacent car. The forming of a train consist from a plurality of single axle lightweight high speed railway cars results in a material reduction in the total weight of the consist. To allow the train consist to travel at higher speeds, the individual cars are provided with low centers of gravity and the suspension systems mounting the car bodies with respect ot the single axles are provided with high pivot points which allow the car bodies to bank into a curve in response to the action of centrifugal force. As the individual cars bank into the curves, the curves may be negotiated at speeds in excess of operational speeds of conventional equipment.

The improved suspension systems utilized in lightweight, high speed railway cars include the use of air springs providing the car body with an air-cushioned ride. The suspension systems further include lateral movement control means which move relative to the car body and axle in a plane transverse of the longitudinal center line of the car body. The relative movement of the lateral movement control means allows the car body to bank into a curve. Additional restraining means are provided in this form of suspension system to maintain the air springs in planes which are substantially parallel to the vertical axis of the car body. Thus the springs are maintained in an upright condition with respect to the car body regardless of the lateral positioning of the body relative to the axle. As a result of this particular operational environment, care must be taken not only to protect the air springs from damage due to excessive dynamic travel but also to provide the same with protective elements capable of cooperating during their functioning with the elements of the suspension system.

It is an object of the present invention to provide an improved fluid pressurized spring having internally carried means which cooperate to prevent damage to the spring as a result of excessive expansion or compression of the same.

Another object is to provide an improved air spring formed primarily from spaced rigid plates interconnected by an intermediate flexible shell, the plates carrying internally of the shell cooperating elements which limit expansion and compression of the spring to protect the same against damaging use, the limiting means being associated with one another and with the inner surfaces of the spaced rigid plates to automatically accommodate inclination of one plate with respect to another without loss of efficient functioning of the protective elements.

A further object is to provide an improved air spring which is protected against damage or undue wear by excessive expansion or compression of the same and which is further particularly adapted for use in an improved form of suspension system which cooperates with the air spring to automatically regulate the internal pressure carried thereby in response to variations in loads applied thereto; the suspension system further cooperating with the air spring to maintain the same in a substantially upright position with respect to a vehicle body being supported thereby; and the excessive compression and expansion limiting means carried by the air spring being adapted to cooperate with portions of the suspension system to allow relative movement between the end plates of the spring while maintaining full and efficient functioning of the limiting means contained therein.

Still a further object is to provide an improved suspension system which utilizes air pressurized, load-supporting springs automatically regulated by the cooperative functioning of the suspension system with respect to a vehicle body carried thereby; the suspension system being provided with lateral movement control means which allow the vehicle body to bank or roll with respect to an axle supporting the same; the suspension system further including the use of vertically pivotally movable air spring restraining means which cooperatively function with the air spring and the lateral movement control means to maintain the same in a substantially upright position with respect to the vehicle body while allowing the air spring to readily compress and expand in response to vertical impact; the air spring being provided with internally carried limiting means to protect the same from damage arising from excessive expansion and compression and which further cooperate with the pivotal movement of the restraining means to accommodate changes in the relative positioning between cooperative elements of the air spring.

Other objects not specifically set forth will become apparent from the following detailed description made in conjunction with the drawings wherein:

Fig. 1 is an end elevation, partly broken away and in section, of a single axle railway car of the lightweight, high speed variety utilizing a suspension system in which the improved air spring of the present invention is particularly adapted for use;

Fig. 2 is an end elevation similar to Fig. 1 illustrating the extent of body roll or lateral movement of the car body afforded by the suspension system as the car negotiates a curve in the track;

Fig. 5 is an enlarged elevation of the improved air spring having portions thereof partly broken away and being taken generally along line 5—5 of Fig. 3;

Fig. 7 is a sectional plan view of a portion of the improved air spring being taken generally along line 7—7 of Fig. 5;

Fig. 8 is an enlarged fragmentary section taken generally along line 8—8 of Fig. 7; and Fig. 9 is an enlarged fragmentary section taken generally along line 9—9 of Fig. 7.

Figure 3:
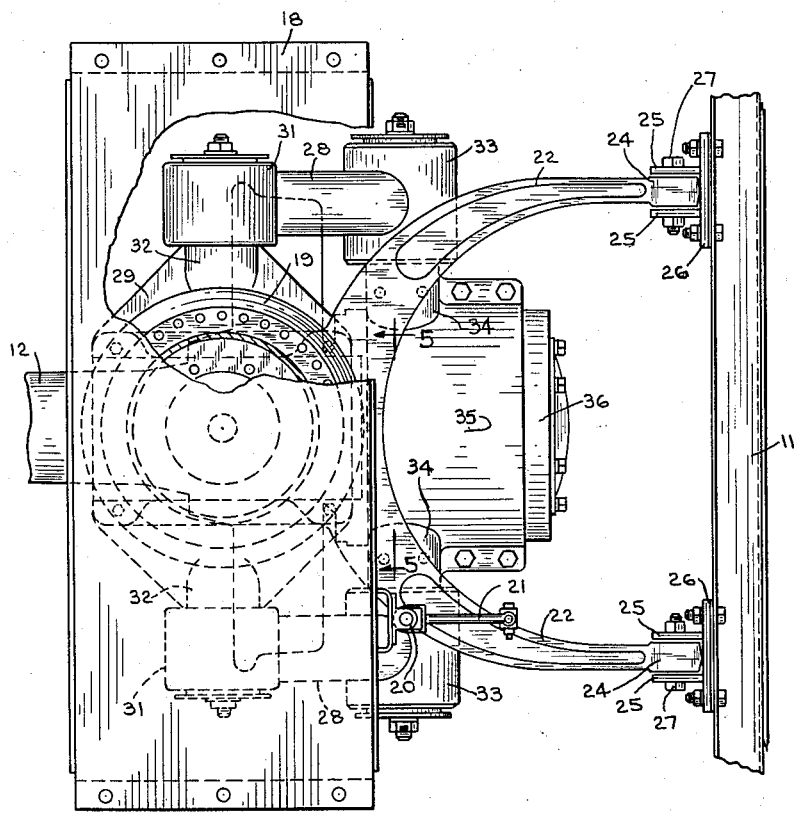
Fig. 3 is an enlarged fragmentary plan view, being partly broken away, of a side assembly of the suspension system taken generally along line 3—3 of Fig. 1.

In Figs. 1 and 2 a lightweight, high speed single axle car 10 is shown as being provided with a car body 11 supported by a suspension system on an axle 12 which, in turn, is provided with laterally spaced wheels 13 having wheel flanges 14 cooperating with spaced rails 15. The car body 11 is provided with a passageway frame 16 from both sides of which extend support beams 17 interconnected with the shell of the car body 11. On either side of the passageway frame 16 are mounted suspension system side assemblies of identical construction and in describing these side assemblies corresponding elements of each assembly will be identified by like reference numerals.

Each of the structural beams 17 support fluid pressure reservoirs 18 which are connected with the top surfaces of vertically acting fluids pressurized springs 19, the interior of each spring being in communication with a reservoir 18. The pressurized fluid preferably used is air which is supplied to each of the reservoirs 18 through leveling valves 20 from a suitable source not shown. The leveling valves 20 are operated by linkages 21 which are attached to laterally directed restraining arms 22 in the form of wishbones which are integrally connected with yokes 23 at their inner ends. The yokes 23 are in turn attached to the bottom portion of the air springs 19. The outermost ends of the restraining arms 22, as shown particularly in Fig. 3, are provided with integral eyes 24 which are received between ears 25 carried by brackets 26 suitably fastened to the outer side frame of the car body 11. The eyes 24 and ears 25 are provided with aligned holes which received therethrough a rubber bushed bolt or pin 27 to pivotally attach the restraining arms 22 to the car body 11.

As a result of this arrangement the car body 11 is allowed to move vertically relative to the axle 12 in response to compression or expansion of the air springs 19 and the yokes 23 and restraining arms 22 pivot with respect to the car body 11 during vertical movement of the same. The yokes 23, by reason of the restraining action of the restraining arms 22, restrict displacement of the bottom portions of the air springs 19 longitudinally of the car body 11. Consequently, the air springs 19 are maintained in a substantially upright position with respect to the car body 11 at all times during the operation of the car 10.

The bottom portions of the air springs 19 are associated with downwardly and outwardly directed spaced struts 28 which are limitedly pivotally connected at their upper ends to reinforced plates 29 positioned below the yokes 23. Intermediate the yokes 23 and the plates 29 are positioned resilient rubber cushions 30 which resiliently interconnect the yokes 23 to the plates 29. The limited pivotal connections between the struts 28 and the plates 29 are provided by rubber torsion sleeve assemblies carried in cylindrical sleeve housings 31 at the upper ends of the struts 28. The torsion sleeve assemblies are of a known type being formed from inner and outer rigid sleeves encasing therebetween a rubber sleeve which allows the rigid sleeves to rotate relative to one another upon the application of torsional stresses and further causes the rigid sleeves to return to their original relative positioning upon an adequate reduction in magnitude of the torsional stresses applied to the assembly. The innermost rigid sleeves are fixedly attached to trunnions 32 (see Fig. 3) which are integrally carried by the plates 29. The outermost rigid sleeves are fixedly secured to the inner surfaces of the cylindrical sleeve housings 31 forming the upper ends of the struts 28.

The lower ends of the struts 28 are also provided with cylindrical sleeve housings 33 which house rubber torsion sleeve assemblies of the type previously described. These assemblies are in turn received about trunnions 34 (see Fig. 3) which are formed integral with saddle members 35 encasing the upper outer surface of journal boxes 36 carried on the outer ends of the axle 12. The saddle support members 35 are removably attached to the journal boxes 36 to allow the car body 11 and its associated suspension system to be dismounted intact from the axle 12 and journal boxes 36. This arrangement provides for ready and uncomplicated removal of the axle 12, wheels 13 and journal boxes 36 from association with the car body 11 and suspension system carried thereby for replacement and maintenance purposes.

In considering the operation of the suspension system and the elements thereof which have been described above, the air springs 19 function to carry the weight of the car 10 and maintain the car body 11 in predetermined spaced vertical relation with respect to the axle 12. Upon variations in load which promote expansion or compression in the air springs 19, the pressure necessary to vertically position the car body 11 with respect to the axle 12 is automatically supplied from a suitable source through the reservoirs 18 into the interior of the air springs 19. If the load is increased and the car body 11 moves vertically downwardly toward the axle 12, the leveling valves 20 are moved downwardly toward the restraining arms 22 and the valve operating linkages 21, being fixed to one of the restraining arms 22, operate the valves 20 to admit pressurized air from the source into the reservoirs 18 and ultimately into the springs 19 to bring about an increase in air pressure in the springs 19 to an extent that the car body 11 is automatically raised back to its initial position with respect to the axle 12. When the load of the car 10 is decreased, the car body 11 will move vertically upwardly with respect to the axle 12 and the operating linkages 21 function to bleed the air springs 19 through their associated reservoirs 18 of excess pressure to adjust the air pressure carried by the springs 19 thereby returning the car body 11 to its initial position with respect to the axle 12. As a result, automatic compensation of air pressure carried by the springs 19 is brought about in response to variations in the weight of the car body 11.

The struts 28 not only transmit the weight of the car body 11 to the axle 12 through the journal boxes 36, but, due to their limited pivotal end connections, the struts 28 are adapted to pivot with respect to their ends in planes transverse of the longitudinal axis of the car body 11 to allow the same to bank or roll in response to the action of centrifugal force when the car 10 negotiates a curve. The rubber torsion sleeve assemblies carried by the cylindrical sleeve housings 31 and 33 of the struts 28 normally bias the car body 11 into an upright position with respect to the axle 12. However, upon the action of centrifugal force of adequate magnitude on the car body 11, the biasing strength of the torsion sleeve assemblies is overcome to an extent that the struts move in transverse planes and pivot in clockwise directions about their end pivotal connections to allow the car body 11 to bank into a curve.

The banking action provided by the pivotal end connections of the struts 28 is illustrated in Fig. 2 wherein the car 10 is illustrated in the process of rounding a curve extending to the left as viewed. The restraining arms 22 and their associated yokes 23 fix the bottom portions of the air springs 19 so that the vertical axes of the springs 19 remain substantially parallel with respect to the vertical axis of the car body 11 at all times. The yokes 23 and restraining arms 22 by reason of being pivotally connected with the car body 11 in a vertical plane only, further function to restrain the axle 12 through the struts 28 and journal boxes 36 from movement longitudinally of the car body 11.

To limit the total degree of banking brought about by the action of centrifugal force, the struts 28 intermediate the ends thereof are provided with brackets 37 carrying resilient abutment means 38 directed inwardly toward the door frames 16 for abutment with plates 39 carried by the door frame 16. As shown in Fig. 2 the right bracket 37 and associated abutment means 38 are in abutment with the plate 39 thereby limiting the total degree of bank supplied to the car body 11 by the action of centrifugal force. In this manner, excessive banking of the car body 11 is eliminated and a safe and comfortable ride is provided regardless of the speed of operation.

The resilient cushions 30, interconnecting the yokes 23 with the plates 29, allow limited relative movement between these elements to provide for positive steering of the axle 12 to eliminate the tendency of the wheel flanges 14 of climbing the outer rail when the car 10 negotiates a curve. The biasing action of the cushions 30 normally maintains the axle 12 at right angles to the longitudinal center line of the car body 11, but, in the event that positive steering action is applied to the axle 12, the same may be turned relative to the longitudinal axis of the car body 11 and the plates 29 accommodate this turning action by tilting forwardly or rearwardly with respect to the yokes 23. The positive steering action, supplied either by an axle steering mechanism or the camming action of the rails on the wheel flanges 14, overcomes the biasing strength of the resilient cushions 30 which re-assert themselves to return the axle to its original position once the positive steering forces have been sufficiently dissipated. The cushions 30 still further absorb the lateral components of impact forces transmitted axially of the struts 28 to prevent the transmission of these components into the body structure through the restraining arms 22.

From the foregoing it may be readily seen that the type of suspension system disclosed is highly efficient in operation and uncomplicated in construction. It is with this type of suspension system that the improved air spring of the present invention is particularly adapted for use. The improved structural features of the air spring will now be described in connection with Figs. 4–9 and in using the improved air spring in the suspension system already described, the operation of the same is greatly enhanced by the cooperative functioning of various elements of the suspension system with the improved elements of the air spring.

Figure 6:
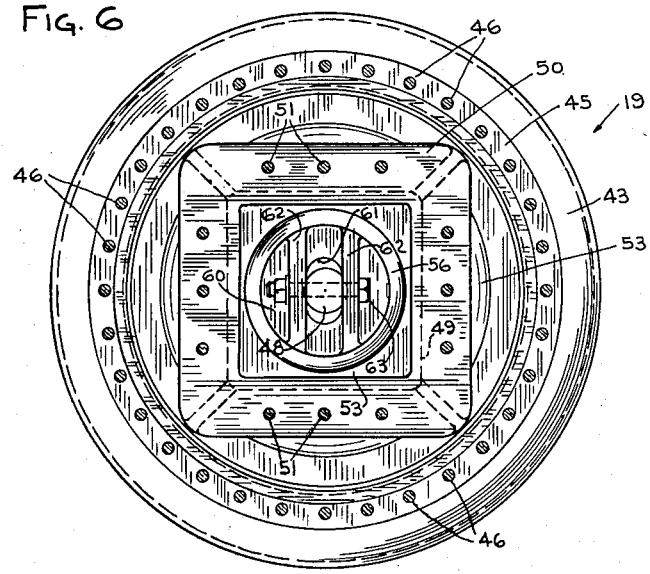
Fig. 6 is a sectional plan view of the improved air spring being taken generally along line 6—6 of Fig. 4.
Figure 4:
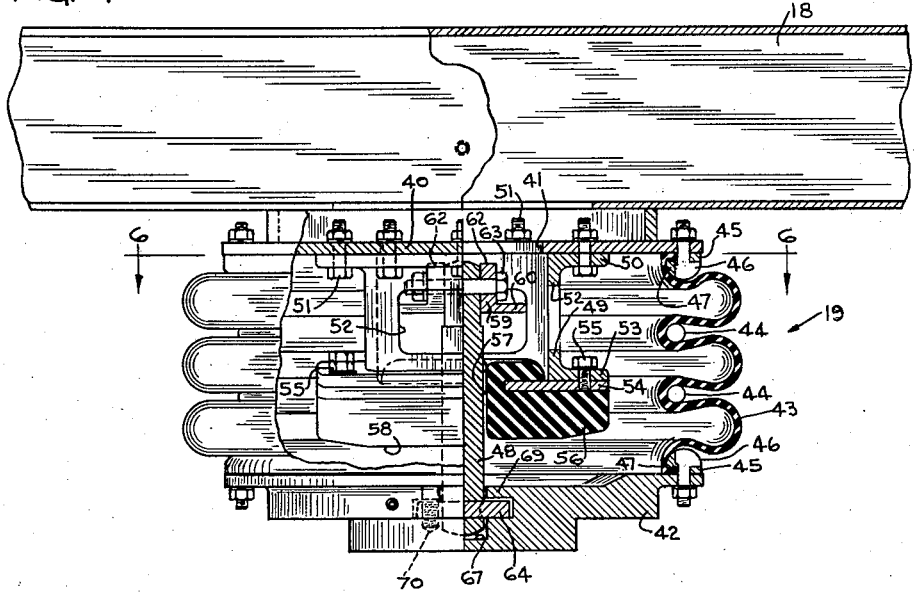
Fig. 4 is an enlarged elevation, partly broken away and sectioned, illustrating the elements of the improved air spring and being generally taken along line 4—4 of Fig. 1.

Referring particularly to Figs. 4–6, the structural features of one of the air springs 19 will be described, it being understood that each of the air springs 19 of Figs. 1 and 2 are identical in construction and operate in the same manner. The air spring 19 includes a top rigid plate 40 which is suitably attached to the bottom wall of an air reservoir 18 and is provided with a central aperture 41 communicating the interior of the reservoir 18 with the interior of the air spring 19. Spaced vertically downwardly from the top plate 40 is a rigid bottom plate 42 which is interconnected with the top plate 40 by an outer compressible shell 43 in the form of rubber bellows being provided with spaced retaining rings 44 to control the type of expansion and compression provided by the bellows 43. The end margins of bellows 43 are clamped in sealed engagement to the opposed surfaces of the top and bottom plates 40 and 42 by clincher rings 45 of known and conventional design. Each of the clincher rings 45 are fastened to their respective plates by spaced bolts 46 and are provided with inturned flanges 47 about the inner peripheries thereof which clamp the end margins of the bellows 43 in sealed engagement with the inner surfaces of the plates 40 and 42.

The bottom plate 42 carries centrally thereof a center post 48 which is pivotally mounted with respect to the bottom plate 42 in a manner to be described. The center post 48 extends upwardly toward the top plate 40 and the uppermost end of the same is free to move toward and away from the inner surface of the top plate 40. Depending downwardly from the inner surface of the top plate 40 toward the bottom plate 42 is a rectangular housing 49 which is provided with an upper flanged portion 50 attached to the inner surface of the top plate 40 by spaced bolts 51. The housing 49 is apertured along its side walls, as indicated by the numeral 52, to reduce the weight of the same while retaining its intended function. The lower portion of the housing 49 is provided with an outwardly extending continuous flange 53 which has attached to the bottom surface thereof a plate 54 by means of spaced threaded bolts 55. The plate 54 is centrally apertured and has bonded thereto along its entire bottom surface, its inner edge and a portion of the top surface inwardly of the aperture, a resilient cushion 56 of rubber which serves as an abutment stop means in a manner to be described. The central portion of the cushion 56 is apertured to provide an opening 57 through which the center post 48 extends into the interior of the housing 49. The opening 57 is of a diameter slightly greater than the diameter of the post 48 to allow the post to move freely while properly positioning the post in the housing 49. The top portion of the rubber cushion 56, which extends inwardly of the edge of the top surface of the plate 54, is positioned within the housing 49. As particularly shown in Fig. 5, the flange 53, plate 54, and cushion 56 are inclined with respect to the horizontal so that the central bottom surface 58 presents an inclined flat surface of substantial area for abutment with the inner surface of the bottom plate 42 during the operation of the air spring 19.

The free top end of the center post 48 is provided with an abutment stop means 59 which is formed with a radially directed bottom portion 60 of circular shape adapted for abutment with the top surface of the cushion 56 positioned within the housing 49. The bottom plate 60 is provided with an oval-shaped slot 61 (see Fig. 6) which is received about the center post 48 and upwardly directed ears 62 carry aligned holes therein which are, in turn, aligned with a transverse hole near the end of the center post 48. The aligned holes receive therethrough a pivot pin 63 pivotally attaching the abutment member 59 to the free end of the center post 48. The abutment member 59 is free to pivot with respect to the longitudinal axis of the center post 48 to an extent provided by the clearance between the edges of the central aperture 61 and the outer surface of the post 48.

Referring particularly to Figs. 4 and 7–9 the manner in which the center post 48 is removably and pivotally mounted in the bottom plate 42 will now be described. The bottom portion of the center post 48 is provided with a transverse pin 64 which extends therethrough to provide the center post 48 with trunnions 65 on either side thereof. The inner surface of the bottom plate 42 is provided with a rectangular opening or slot 66 (see Fig. 7) which receives the bottom end of the center post 48 therein. Diagonally opposite portions of the slot 66 are undercut to provide internal grooves 68 having back walls of arcuate outline to allow the trunnions 65 to be received below overhanging portions 69 of the bottom plate 42. One of the overhanging portions 69, as shown in Figs. 4 and 7, is provided with a drilled hole aligned with a threaded hole in the bottom surface of the groove 68 to receive a threaded locking pin 70 for blocking one of the grooves 68.

In mounting the center post with respect to the bottom plate 42, the bottom portion of the post with its associated trunnions 65 is aligned with the rectangular opening 66 and moved downwardly until the trunnions 65 become aligned with the transversely extending grooves 68 below the overhanging portions 69. As shown in Figs. 4, 8 and 9, the center portion 67 of the slot 66 is recessed downwardly below the grooves 68 to receive the bottom end of the center post 48 thereby allowing the trunnions 65 to become aligned with the diagonally positioned grooves 68. The center post 48 is then rotated clockwise and the trunnions 65 moved into the grooves 68 below the overhanging portions 69 thereby mounting the center post 48 with respect to the plate 42. The locking pin 70 is then advanced into its proper position to block one of the grooves 68 thereby fixing the center post 48 against counterclockwise rotation and disconnection from the bottom plate 42. The center post 48 is allowed to pivot about the longitudinal axis of its pin 64 held by the overhanging portions 69 of the grooves 68 thereby allowing the post 48 to move in two directions out of its vertical positioning with respect to the plate 42.

In the operation of the suspension system as previously described, the air springs 19 support the weight of the car body 11 and the air pressure carried thereby absorbs the vertical shock caused by vertical rise and fall of the car body 11 during the operation of the car 10. The structural elements of the air springs 19 described above cooperate with one another to limit expansion and compression of the air springs 19 to protect the elements thereof against damage. In many instances, vertical impacts to the car body 11 are of sufficient magnitude to overcome the shock absorbing ability of the air cushion provided by the pressurized springs 19. Under such circumstances, the springs 19 become expanded or compressed to an extent that damage to the particular elements forming the springs may occur.

The total expansion of the spring 19 will be limited by contact between the bottom surface of the abutment plate 59 with the top surface of the resilient abutment stop means 56 within the housing 49. The top and bottom plates 40 and 42 move away from one another until the bottom surface of the abutment means 59, moving with the center post 48 away from the top plate 40, contacts the top surface of the resilient cushion 56 thereby limiting the total expansion of the air spring 19. Upon compression of the same, the top and bottom plates 40 and 42 move toward one another until the bottom surface 58 of the resilient cushion 56 contacts the inner surface of the bottom plate 42. In this manner the total extent of expansion or compression is limited by abutment of the elements described. The resilient cushion 56 acts as both an abutment stop means and an abutment means depending on the type of limiting action required.

Upon vertical impact to the car body 11 the same will first move downwardly with respect to the axle 12 and the struts 23 will retain their normal positions. As a result, the yokes 23 will be tilted upwardly by downward movement of the brackets 26 and this tilting action is allowed by reason of the flexibility of the air springs 19 and the resilient cushions 30. Consequently, the yokes 23 being attached to the bottom plates 42 of the air springs 19 will tilt the bottom plates 42 to the same extent of inclination as imparted to the yokes 23 by downward movement of the car body 11. Due to the tilting of the bottom plates 42, the flange 53, plate 54 and resilient cushion 56 are mounted in an inclined position, the angle of inclination being predetermined to substantially conform with the expected angle of inclination of the bottom plate 42 during operation of the car 10. As a result of equal or near equal inclination of the bottom surface 58 of the cushion 56 and the inner surface of the bottom plate 42, the two surfaces will contact one another over a substantial area upon the air springs 19 being compressed to the limiting extent. By providing surface contact over a substantial area the wear between the abutting elements is inconsequential, whereas, if point contact were established the wearing down of the limited surface areas brought into abutment would eventually allow the air springs 19 to be compressed to an extent where damage might readily occur.

Following complete compression of the air springs 19, the car body 11 will tend to rise above its normal vertical relation with respect to the axle 12 and the air springs will be expanded to an extent that the abutment plate 59 will be brought into contact with the top surface of the resilient cushion 56 positioned within the housing 49. Rising of the vehicle body 11 will change the inclination of the yokes 23 and the bottom plate 42 to an extent that the bottom plate 42 will move past the horizontal plane and become inclined in the opposite direction. In order to promote full surface contact between the bottom surface of the abutment plate 59 and the top surface of the cushion 56, the center post 48 is pivotally attached to the bottom plate 42 as previously described and is free to move transversely relative to the cushion 56 within the opening 57. Furthermore, the abutment plate 59 is pivotally attached to the free end of the center post 48 and, by reason of the pivotal connection, the abutment plate 59 will be automatically centered with respect to the top surface of the cushion 56 thereby providing full surface contact between the same to prevent localized wear of the elements. Consequently, the extent to which the air springs 19 are expanded upon upward vertical movement of the car body 11 will be limited by contact between the abutment plate 59 and the top surface of the cushion 56.

The functioning of the expansion and compression limiting means of the air springs 19 previously described will be brought about in the same manner as described whether or not an impact to the car body 11 produces lateral movement or roll of the same. These elements will furthermore function in the same manner as described in the event that vertical impact occurs upon the negotiation of a curve during which the car body 11 is banking into the curve and the struts 28 are moving about their pivotal end connections. As a result, the particular expansion and compression limiting means utilized in the air springs 19 are adapted for efficient functioning under all operating conditions. The elements forming the limiting means will function regardless of the motion imparted to the vehicle body 11 as long as vertical movement of the same is present. The limiting means not only prevent damage to the air springs and other elements of the suspension system by guarding against excessive expansion and compression of the springs, but also limit total vertical movement of the car body 11 relative to the axle 12. This latter feature is of particular importance when the improved springs are used in suspension systems of the type described which support a car body in low-slung relation with the axle and rails. The car body may move vertically relative to the axle and rails to a limited extent only so as to avoid damaging contact with either the axle or the rails.

Obviously many modifications and variations of the invention as hereinbefore set forth may be made without departing from the spirit and scope thereof, and therefore only such limitations should be imposed as are indicated in the appended claims.

I claim:

1. An air spring for use in a vehicle body suspension system, said spring including a pair of rigid end plates interconnected by an intermediate flexible shell, one of said plates carrying a center post positioned within said shell and having a free end movable toward and away from the other of said plates, a housing carried by said other plate internally of said shell and receiving the free end of said post therein, the innermost end of said housing carrying a rigidly supported resilient cushion being provided with an opening therethrough which freely receives said post, and laterally extending abutment means carried by said post near the free end thereof and within said housing, said abutment means being aligned with the inner surface of said cushion to engage the same upon movement of said plates away from one another to a predetermined extent, the outer surface of said cushion being positioned for abutment with said first plate upon movement of said plates toward one another to a predetermined extent.

2. An air spring for use in a vehicle body suspension system, said spring including a pair of rigid end plates interconnected by an intermediate flexible shell, one of said plates carrying a center post positioned within said shell and having a free end movable toward and away from the other of said plates, a housing carried by said other plate internally of said shell and receiving the free end of said post therein, the innermost end of said housing carrying a rigidly supported resilient cushion being provided with an opening therethrough which freely receives said post, and transversely extending abutment means carried by said post near the free end thereof and within said housing, said abutment means being aligned with the inner surface of said cushion to engage the same upon movement of said plates away from one another to a predetermined extent, the outer surface of said cushion being positioned for abutment with said first plate upon movement of said plates toward one another to a predetermined extent, said post being pivotally mounted on said first plate and the abutment means carried by said post being pivotal relative thereto to retain substantially full abutment contact between said abutment means and the inner surface of said cushion upon inclination of said plates relative to one another.

3. An air spring for use in a vehicle body suspension system, said spring including a pair of rigid end plates interconnected by an intermediate flexible shell, one of said plates removably carrying a center post positioned within said shell and having a free end movable toward and away from the other of said plates, a housing carried by said other plate internally of said shell and receiving the free end of said post therein, the innermost end of said housing carrying a rigidly supported resilient cushion being provided with an opening therethrough which freely receives said post, and transversely extending abutment means carried by said post near the free end thereof and within said housing, said abutment means being aligned with the inner surface of said cushion to engage the same upon movement of said plates away from one another to a predetermined extent, the outer surface of said cushion being positioned for abutment with said first plate upon movement of said plates toward one another to a predetermined extent, said post being pivotally mounted on said first plate and the abutment means carried by said post being pivotal relative thereto to retain substantially full abutment contact between said abutment means and the inner surface of said cushion upon inclination of said first plate relative to said other plate, the outer surface of said cushion being inclined to abut said first plate over a substantial area of said cushion upon the inclination of said first plate relative to said other plate.

4. In a suspension system supporting a vehicle body on a wheel-carrying axle, said system comprising vertically acting fluid pressurized springs in direct support of said body, load-transmitting means connected to and extending between said springs and said axle, and spring restraining means interconnecting each of said springs and said body to maintain said springs in a substantially upright position with respect to said body, said restraining means being pivotal relative to said body in a vertical plane for movement with said springs upon compression of said springs by said body, the provision of each of said springs including a pair of rigid end plates interconnected by an intermediate flexible shell, one of said plates carrying a center post positioned within said shell and having a free end movable toward and away from the other of said plates, a housing carried by said other plate internally of said shell and receiving the free end of said post therein, the innermost end of said housing carrying a rigidly supported resilient cushion being provided with an opening therethrough which freely receives said post, and transversely extending abutment means carried by said post near the free end thereof and within said housing, said abutment means being aligned with the inner surface of said cushion to engage the same upon movement of said plates away from one another to a predetermined extent, the outer surface of said cushion being positioned for abutment with said first plate upon movement of said plates toward one another to a predetermined extent.

5. In a suspension system supporting a vehicle body on a wheel-carrying axle, said system comprising vertically acting fluid pressurized springs in direct support of said body, load-transmitting means connected to and extending between said springs and said axle, and spring restraining means interconnecting each of said springs and said body to maintain said springs in a substantially upright position with respect to said body, said restraining means being pivotal relative to said body in a vertical plane for movement with said springs upon compression of said springs by said body, the provision of each of said springs including a pair of rigid end plates interconnected by an intermediate flexible shell, one of said plates carrying a center post positioned within said shell and having a free end movable toward and away from the other of said plates, a housing carried by said other plate internally of said shell and receiving the free end of said post therein, the innermost end of said housing carrying a rigidly supported resilient cushion being provided with an opening therethrough which freely receives said post, and laterally extending abutment means carried by said post near the free end thereof and within said housing, said abutment means being aligned with the inner surface of said cushion to engage the same upon movement of said plates away from one another to a predetermined extent, the outer surface of said cushion being positioned for abutment with said first plate upon movement of said plates toward one another to a predetermined extent, said first plate being connected with a spring restraining means and said other plate being fixed with respect to said body, said post being pivotally mounted on said first plate and the abutment means carried by said post being pivotal relative thereto to retain substantially full abutment contact between said abutment means and the inner surface of said cushion upon inclination of said plates relative to one another.

6. In a suspension system supporting a vehicle body on a wheel-carrying axle, said system comprising vertically acting fluid pressurized springs in direct support of said body, load-transmitting means connected to and extending between said springs and said axle, and spring restraining means interconnecting each of said springs and said body to maintain said springs in a substantially upright position with respect to said body, said restraining means being pivotal relative to said body in a vertical plane for movement with said springs upon compression of said springs by said body, the provision of each of said springs including a pair of rigid end plates interconnected by an intermediate flexible shell, one of said plates removably carrying a center post positioned within said shell having a free end movable toward and away from the other of said plates, a housing carried by said other plate internally of said shell and receiving the free end of said post therein, the innermost end of said housing carrying a rigidly supported resilient cushion being provided with an opening therethrough which freely receives said post, and laterally extending abutment means carried by said post near the free end thereof and within said housing, said abutment means being aligned with the inner surface of said cushion to engage the same upon movement of said plates away from one another to a predetermined extent, the outer surface of said cushion being positioned for abutment with said first plate upon movement of said plates toward one another to a predetermined extent, said first plate being attached to a restraining means to move with the same relative to said other plate in the vertical pivotal plane of said restraining means, the other plate being fixedly mounted with respect to said body, the outer surface of said cushion being inclined to abut said first plate over a substantial area of said cushion upon the inclination of said first plate relative to said other plate, compression of said springs resulting substantially from the movement of said other plate toward said first plate.

7. In a suspension system supporting a vehicle body on a wheel-carrying axle, the system including laterally spaced air springs each being formed from vertically spaced rigid top and bottom plates interconnected by an intermediate flexible shell portion, the top plate being fixedly connected with the vehicle body and the bottom plate being attached to a restraining means which is vertically pivotally mounted on the vehicle body, and lateral movement control means operatively connected with the bottom plate of each of the air springs and extending downwardly into load-transmitting attachment with the axle, the provision of compression and expansion limiting means in each of said air springs, said limiting means including a center post carried by said bottom plate and positioned within said shell portion and having a free end movable toward and away from said top plate, a housing carried by said top plate internally of said shell portion and receiving the free end of said post therein, the innermost end of said housing carrying a rigidly supported resilient cushion which is provided with an opening therethrough which freely receives said post, and transversely extending abutment means carried by said post near the free end thereof and within said housing, said abutment means being aligned with the inner surface of said cushion to engage the same upon movement of said plates away from one another to a predetermined extent, the outer surface of said cushion being positioned for abutment with said bottom plate upon movement of said plates toward one another to a predetermined extent.

8. In a suspension system supporting a vehicle body on a wheel-carrying axle, the system including laterally spaced air springs each being formed from vertically spaced rigid top and bottom plates interconnected by an intermediate flexible shell portion, the top plate being fixedly connected with the vehicle body and the bottom plate being attached to a restraining means which is vertically pivotally mounted on the vehicle body, and lateral movement control means operatively connected with the bottom plate of each of the air springs and extending downwardly into load-transmitting attachment with the axle, the provision of compression and expansion limiting means in each of said air springs, said limiting means including a center post carried by said bottom plate and positioned within said shell and having a free end movable toward and away from said top plate, a housing carried by said top plate internally of said shell and receiving the free end of said post therein, the innermost end of said housing carrying a rigidly supported resilient cushion which is provided with an opening therethrough which freely receives said post, and laterally extending abutment means carried by said post near the free end thereof and within said housing, said abutment means being aligned with the inner surface of said cushion upon movement of said plates away from one another to a predetermined extent, the outer surface of said cushion being positioned for abutment with said bottom plate upon movement of said plates toward one another to a predetermined extent, said post being pivotally mounted on said bottom plate and the abutment means carried by said post being pivotal relative thereto to retain substantially full abutment contact between said abutment means and the inner surface of said cushion upon inclination of said bottom plate relative to said top plate by said restraining means, the outer surface of said cushion being inclined to abut said bottom plate over a substantial area of said cushion upon the inclination of said bottom plate relative to said top plate in response to vertical pivotal movement of said restraining means.

References Cited in the file of this patent

UNITED STATES PATENTS

| 1,107,714 | Sharp | Aug. 18, 1914 |
| 2,056,106 | Kuhn | Sept. 29, 1936 |
| 2,115,072 | Hunt et al. | Apr. 26, 1938 |
| 2,537,637 | Candlin, Jr. et al. | Jan. 9, 1951 |

FOREIGN PATENTS

| 550,896 | Great Britain | Jan. 29, 1943 |
| 157,620 | Australia | July 13, 1954 |

OTHER REFERENCES

Germany, application G 13,986 (K47a Gr 17) printed December 22, 1955.